US010971876B1

(12) United States Patent
Staats, Jr. et al.

(10) Patent No.: US 10,971,876 B1
(45) Date of Patent: Apr. 6, 2021

(54) BELT STRUCTURES FOR ROTARY ELECTRICAL CONTACT DEVICE

(71) Applicant: National Technology & Engineering Solutions of Sandia, LLC, Albuquerque, NM (US)

(72) Inventors: Wayne Lawrence Staats, Jr., Livermore, CA (US); Jeffrey P. Koplow, San Ramon, CA (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 153 days.

(21) Appl. No.: 16/420,697

(22) Filed: May 23, 2019

(51) Int. Cl.
*H01R 39/64* (2006.01)
*H01R 39/28* (2006.01)

(52) U.S. Cl.
CPC ............. *H01R 39/64* (2013.01); *H01R 39/28* (2013.01); *H01R 2201/10* (2013.01)

(58) Field of Classification Search
CPC ......... H01R 39/00; H01R 13/44; F16H 59/00; F16H 63/02
USPC .......................................................... 439/18
See application file for complete search history.

(56) References Cited

U.S. PATENT DOCUMENTS

| | | | | |
|---|---|---|---|---|
| 4,135,869 A * | 1/1979 | Loyer | ....................... | B21F 3/02 425/71 |
| 5,182,968 A * | 2/1993 | Mott | .................. | F16H 61/66272 474/11 |
| 5,556,346 A * | 9/1996 | Genzel | .............. | F16H 61/66272 474/18 |
| 5,683,318 A * | 11/1997 | Snel | ....................... | F16H 37/021 474/11 |
| RE35,820 E * | 6/1998 | Guginsky | ................ | F16L 11/18 174/102 R |
| 5,871,411 A * | 2/1999 | Senger | .............. | F16H 61/66254 474/11 |
| 6,099,424 A * | 8/2000 | Tsai | ....................... | F16H 61/662 474/12 |
| 6,119,800 A * | 9/2000 | McComber | .............. | B60K 1/00 180/65.7 |
| 6,283,893 B1 * | 9/2001 | Fritzner | ................... | F16D 48/06 474/11 |

(Continued)

OTHER PUBLICATIONS

International Search Report of the International Searching Authority dated May 18, 2011 for PCT/US2012/038698, 3 pages.

*Primary Examiner* — Alexander Gilman
(74) *Attorney, Agent, or Firm* — Medley, Behrens & Lewis, LLC

(57) ABSTRACT

Technologies pertaining to a rotary electrical contact device are described herein. A rotary electrical contact device comprises a first sheave that is disposed about a first axis and a second sheave that rotates about the first axis or a second axis that is parallel to the first axis. The device further includes two planetary sheaves that revolve around the first and second sheaves, and a belt that makes contact with each of the sheaves, the belt having an aspect ratio great than 1:1. As the first sheave rotates, the planetary sheaves revolve about the first and second sheaves and cause the belt to deform and roll along the second sheave. The belt makes rolling contact with the four sheaves. The belt comprises electrically conductive components arranged such that as the belt rolls along the sheaves, the belt maintains electrical contact between the first sheave and the second sheave.

20 Claims, 9 Drawing Sheets

(56) References Cited

U.S. PATENT DOCUMENTS

| | | | |
|---|---|---|---|
| 6,443,871 B2* | 9/2002 | Taniguchi | F16H 61/66272 474/70 |
| 6,537,176 B2* | 3/2003 | Fessler | F16H 61/66259 474/28 |
| 7,066,860 B2* | 6/2006 | Habuchi | F16H 37/027 475/208 |
| 7,128,671 B2* | 10/2006 | Gu | B60K 6/543 474/23 |
| 7,174,245 B2* | 2/2007 | Ries-Mueller | F16H 61/66272 477/45 |
| 7,270,591 B2* | 9/2007 | Deshpande | B24B 23/03 451/357 |
| 7,301,100 B2* | 11/2007 | Drane | H02G 3/088 174/481 |
| 7,371,150 B2* | 5/2008 | Deshpande | B24B 23/03 451/357 |
| 7,837,537 B2* | 11/2010 | Wall | B24B 21/20 451/296 |
| 7,959,104 B2* | 6/2011 | Kuntz | A63H 33/003 244/2 |
| 7,959,361 B2* | 6/2011 | Lu | G02B 6/3826 385/53 |
| 8,100,791 B2* | 1/2012 | Yamaguchi | F16H 63/065 474/28 |
| 8,202,008 B2* | 6/2012 | Lu | G02B 6/3816 385/53 |
| 8,535,186 B2* | 9/2013 | Asaoka | F16H 61/66259 474/28 |
| 8,585,413 B2* | 11/2013 | Koplow | H02K 31/02 439/18 |
| 8,600,634 B2* | 12/2013 | Van Der Sluid | F16H 61/66272 701/61 |
| 9,182,017 B2* | 11/2015 | Yoshida | F16H 9/125 |
| 10,316,968 B2* | 6/2019 | Lochocki | F16H 61/66272 |
| 2001/0044349 A1* | 11/2001 | Tanigawa | F16H 9/125 474/8 |
| 2003/0081905 A1* | 5/2003 | Bethea | G02B 6/3813 385/55 |
| 2006/0231282 A1* | 10/2006 | Greenfield | H02G 3/14 174/67 |
| 2009/0286411 A1* | 11/2009 | Bazayev | H01H 9/0264 439/145 |
| 2010/0184543 A1* | 7/2010 | Yamashita | F16H 63/062 474/11 |
| 2011/0104919 A1* | 5/2011 | Patel | H01R 13/6658 439/137 |
| 2011/0223785 A1* | 9/2011 | Jiang | H01R 25/003 439/106 |
| 2011/0284216 A1* | 11/2011 | Addis | E21B 47/01 166/250.01 |
| 2012/0002356 A1* | 1/2012 | Linnane | H02G 3/26 361/679.01 |

* cited by examiner

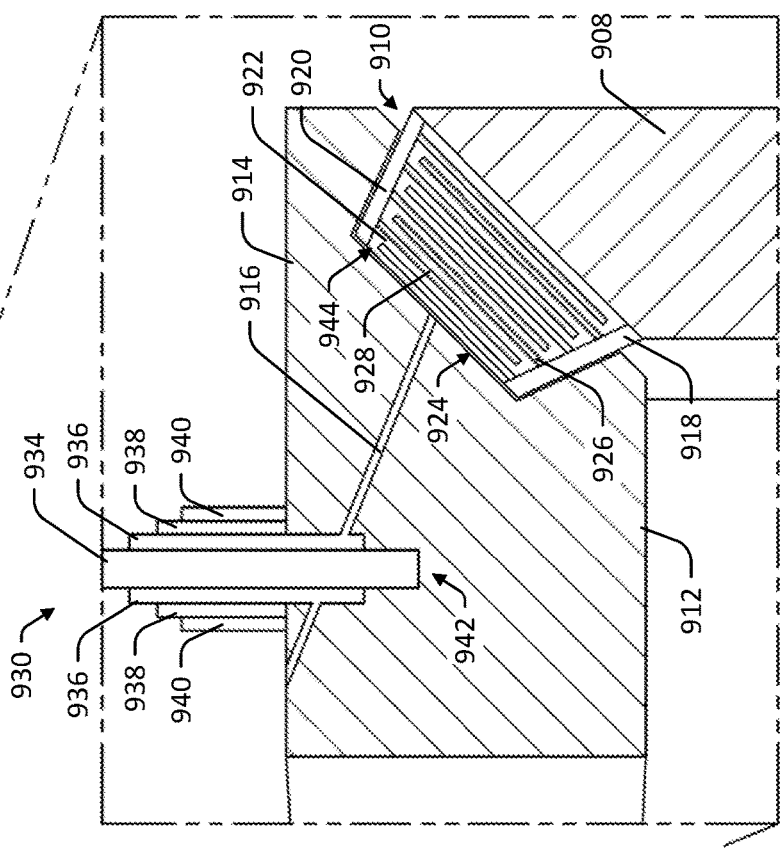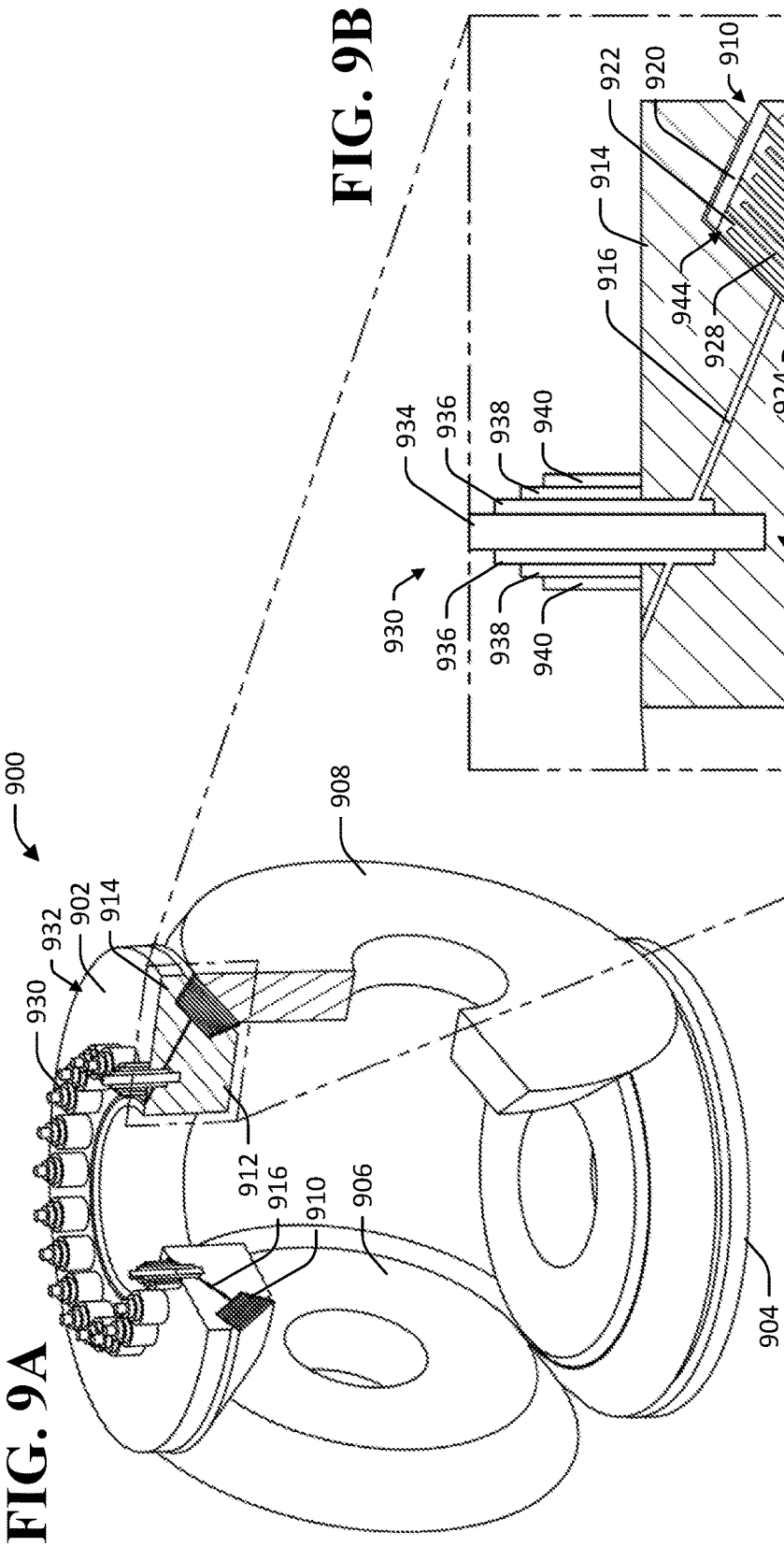

BELT STRUCTURES FOR ROTARY ELECTRICAL CONTACT DEVICE

STATEMENT OF GOVERNMENTAL INTEREST

This invention was made with Government support under Contract No. DE-NA0003525 awarded by the United States Department of Energy/National Nuclear Security Administration. The U.S. Government has certain rights in the invention.

BACKGROUND

Electric machines commonly require conduction of electric current between a rotating structure or member and a stationary structure. Conventionally, such conduction was achieved by providing a rotary electrical contact comprised of a rotating metal ring and stationary graphite brushes spring loaded against the ring to maintain contact between the brushes and the ring. In the conventional rotary electrical contact, sliding contact between the metal ring and the graphite brushes during normal operation of an electric machine causes wear that degrades the brushes. Furthermore, this sliding contact and contact bounce can cause electrical arcing that causes ablation of the graphite brushes. As a result, conventional rotary electrical contacts have short lifetimes and require frequent maintenance to replace the graphite brushes and clean carbon dust resulting from wear of the brushes.

To address these and other problems, a rolling-contact rotary electrical contact was developed to provide an electrical connection between a stationary member and a rotating member through an electrically conductive belt by way of rolling contact between the belt and the members, rather than sliding contact. Embodiments of this rotary electrical contact are described in U.S. Pat. No. 8,585,413. Generally, such embodiments include a stationary sheave, a rotating sheave, a pair of planetary sheaves, and a helical coil belt that is wound around the sheaves and that maintains electrical contact with the sheaves as the rotating sheave rotates. A total electrical resistance of such a rotary electrical contact has been shown to be a function of a contact resistance between windings of the helical coil belt and the sheaves and a longitudinal resistance of the helical coil belt along a length of the belt.

SUMMARY

The following is a brief summary of subject matter that is described in greater detail herein. This summary is not intended to be limiting as to the scope of the claims.

Various technologies pertaining to a rolling-contact rotary electrical contact device are described herein. In an exemplary embodiment, a rotary electrical contact device comprises a first sheave that is disposed about a first axis. The device further comprises a second sheave that is offset from the first sheave, and that rotates about the first axis or a second axis that is parallel to the first axis. The device also includes two planetary sheaves that revolve around the first and second sheaves, and a belt that makes contact with at least a portion of each of the first sheave, the second sheave, and the two planetary sheaves. As the first sheave rotates, the planetary sheaves revolve about the first and second sheaves and cause the belt to deform and roll along the second sheave. The belt makes rolling contact with each of the four sheaves. The belt is electrically conductive such that as the belt rolls along the sheaves, the belt maintains electrical contact between the first sheave and the second sheave.

Previously, belts for such rotary electrical contact devices had been made to have a substantially 1:1 aspect ratio in a cross section cut across a length of the belt, in order to allow the belt to be easily deformed along multiple different dimensions of the belt. This was believed to be necessary in order to allow the belt to deform in multiple different directions as the sheaves moved, so as to cause the belt to maintain contact with sheaves arranged at angles to one another. In order to achieve a belt that readily bends in multiple axes and that also has low electrical resistance, prior rolling-contact rotary electrical contact devices have used belts made of helical coils of conductive wires. A helical coil belt is generally not stiff in the axial direction. As a result, a helical coil belt cannot readily be placed under tension without deformation of the belt. Therefore, in operation of a rolling-contact rotary electrical contact device, centrifugal force resulting from rotation of the device can cause loosening of the helical coil belt. Loosening of the helical coil belt can cause mechanical failure of the belt, decoupling of the belt from the sheaves, or simply a reduction in contact force between the belt and sheaves that in turn increases the electrical resistance of the contact.

As will be described in greater detail below, rather than bending along multiple orthogonal axes (e.g., dimensions of the belt), the belt in the rotary electrical contact devices described herein bends primarily along a single axis or bending plane. Therefore, in exemplary embodiments described herein, a rotary electrical contact device comprises a conductive belt having an aspect ratio that is greater than 1:1 (e.g., greater than or equal to 2:1, 5:1, or 10:1). With more particularity, in exemplary embodiments a cross-section of the conductive belt cut perpendicular to the longitudinal axis of the belt has a greater width than thickness (e.g., a width that is greater than or equal to twice the thickness, five times the thickness, or ten times the thickness). By way of an example, in one embodiment such a wide-aspect-ratio belt can be a metal (e.g., copper) strip that has a width and a thickness, wherein an aspect ratio between the width and the thickness of the strip is greater than 1:1. When the belt is enabled to have an aspect ratio greater than 1:1, the belt can be designed with a greater number of engineering degrees of freedom among longitudinal stiffness, bending stiffness, and electrical resistance. For example, a belt with an aspect ratio greater than 1:1 can be designed to have a lower electrical resistance than a 1:1 aspect ratio belt for a given longitudinal stiffness and bending stiffness. In another example, a belt with an aspect ratio greater than 1:1 can be configured to have a greater longitudinal stiffness than a 1:1 aspect ratio belt for a given electrical resistance and bending stiffness. A wide but thin belt can be designed to have a high cross-sectional area, defined as the width of the belt times the thickness of the belt, but a low bending stiffness along the principal bending axis wherein the bending stiffness is proportional to the thickness cubed.

In further exemplary embodiments, the belt can include a plurality of cleats affixed to a longitudinal conductive element that runs the length of the belt. The cleats are configured to mate with grooves formed in the sheaves. The cleats make contact with the sheaves, whereas the longitudinal conductive element does not make direct contact with the sheaves. The cleats and the longitudinal conductive element can be independently designed to have different properties. In an example, the cleats can be made to be both electrically conductive and highly resistant to wear. Furthering the example, the longitudinal conductive element can be made to be electrically conductive and to have a low bending stiffness along the bending axis of the belt.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

BRIEF DESCRIPTION OF THE DRAWINGS

FIG. 9A depicts another exemplary rotary electrical contact device.

FIG. 9B is a partial cross-sectional view of a belt and sheaves of the rotary electrical contact device depicted in FIG. 9A.

DETAILED DESCRIPTION

Figure 1:
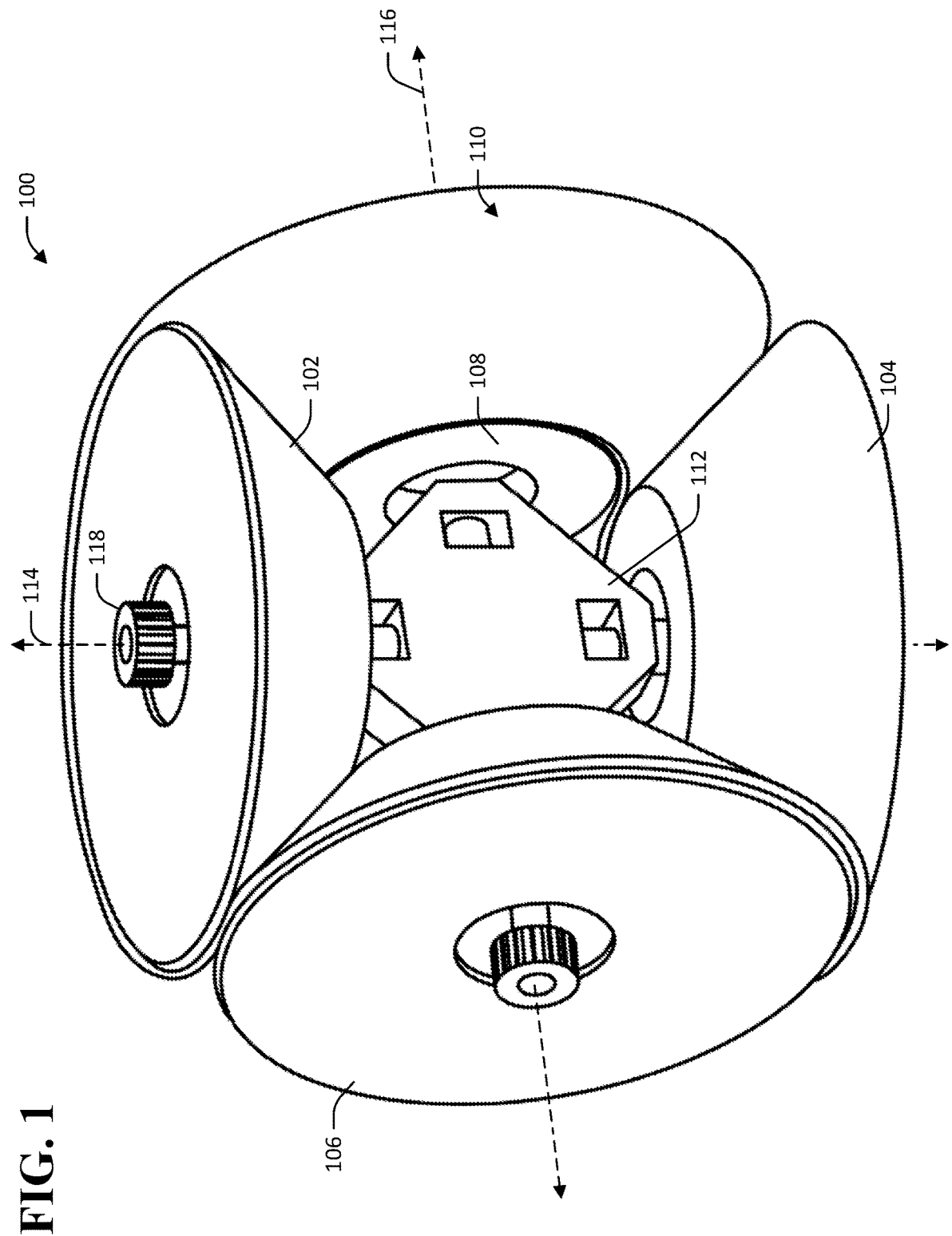
FIG. 1 depicts an exemplary rotary electrical contact device.

Various technologies pertaining to a rotary electrical contact device are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. Additionally, as used herein, the term "exemplary" is intended to mean serving as an illustration or example of something and is not intended to indicate a preference.

With reference to FIG. 1, an exemplary rotary electrical contact device 100 that facilitates conduction of electrical current from a rotating member to another member is illustrated. The device 100 includes a plurality of sheaves 102-108 and a belt 110 that is wound around the sheaves 102-108. The device 100 further includes a coupling mechanism 112 that can be coupled to one or more of the sheaves 102-108.

A first sheave 102 in the sheaves 102-108 is disposed about a first axis 114. In the exemplary device 100 shown in FIG. 1, a second sheave 104 in the sheaves 102-108 is also disposed about the first axis 114 and offset from the first sheave 102 along the first axis 114 such that the first sheave 102 and the second sheave 104 lie in substantially parallel planes. In other embodiments, the second sheave 104 can be disposed about a different axis that is parallel to the first axis 114. The first sheave 102 and the second sheave 104 are referred to herein collectively as primary sheaves 102, 104. The sheaves 102-108 further include a first planetary sheave 106 and a second planetary sheave 108. The first planetary sheave 106 is disposed about a second axis 116. In the exemplary rotary electrical contact device 100 shown in FIG. 1, the second planetary sheave 108 is disposed about the second axis 116. In other embodiments, the second planetary sheave 108 can be disposed about a different axis that is parallel to the second axis 116. In the exemplary embodiment shown, the first axis 114 and the second axis 116 are orthogonal. In other embodiments, the first axis 114 and the second axis 116 are skew or intersect at an angle other than a right angle. In the exemplary rotary electrical contact device 100, each of the sheaves 102-108 is beveled. Stated differently, each of the sheaves 102-108 may be shaped as the frustum of a cone. In other embodiments, the sheaves 102-108 can be substantially cylindrical.

The belt 110 is positioned around the sheaves 102-108 such that the belt makes contact with at least a portion of each of the sheaves 102-108. The belt 110 is electrically conductive and maintains electrical contact between the first primary sheave 102 and the second primary sheave 104. By way of illustration, and not limitation, the belt 110 has a serpentine swept profile that follows a path similar to the primary path of a baseball seam in order to wrap around the sheaves 102-108 and maintain contact with the sheaves 102-108.

Operation of the rotary electrical contact device 100 is now described. In an exemplary application of the rotary electrical contact device 100, the first primary sheave 102 can be coupled to a rotor 118 that can be, or be coupled to, a rotor of an electric machine such as a motor or generator. Rotation of the rotor 118 (e.g., during operation of an electric machine) can cause the first primary sheave 102 to rotate about the axis 114. The rotary electrical contact device 100 is configured to maintain electrical contact between the first primary sheave 102 and the second primary sheave 104 by way of the belt 110 while the first primary sheave 102 is rotating, whereas the second primary sheave 104 may be stationary or rotating. The second primary sheave 104 can be or be included in a stator of an electric machine. As the first primary sheave 102 rotates about the first axis 114, the sheave 102 exerts forces on the belt 110 that in turn cause the belt 110 to exert forces on the planetary sheaves 106, 108. These forces tend to cause the planetary sheaves 106, 108 to revolve around the first axis 114. In the exemplary device 100, the coupling mechanism 112 couples the first primary sheave 102 to the planetary sheaves 106, 108 such that the planetary sheaves 106, 108 are free to rotate about the second axis 116. Thus, when the first primary sheave 102 rotates, the planetary sheaves 106, 108 roll along the belt 110 and revolve about the first axis 114. The belt 110 is electrically conductive and therefore as the first primary sheave 102 rotates, the belt 110 maintains electrical contact between the first primary sheave 102 and the second primary sheave 104.

In exemplary embodiments, the belt 110 has an aspect ratio that is greater than 1:1 in a cross-section that is cut orthogonal to a length of the belt 110. For example, and referring now to FIG. 2, a cutaway view 200 of the belt 110 is shown. The cutaway view 200 depicts a portion of the belt 110 of the rotary electrical contact device separate from the other elements of the rotary electrical contact device 100 (e.g., the sheaves 102-108). In the cutaway view 200, the belt 110 is cut perpendicular to a length of the belt 110, which length forms a curved path due to curvature of the belt 110. A thickness t and a width w of the belt 110 are shown in the view 200. The belt 110 has a thickness t that is less than its width w, such that the aspect ratio of the belt is greater than 1:1 in the cross-section taken along a plane perpendicular to the length of the belt 110. As noted above, it has been determined that bending of a belt in a rotary electrical contact device such as the device 100 shown in FIG. 1 occurs primarily along a single bending plane. Two planes, A and B, are depicted in the cutaway view 200 of FIG. 2. Plane A is coplanar with the width w of the belt 110 at the cut in the belt 110, whereas plane B is coplanar with the length of the belt 110 at the cut in the belt 110. In the exemplary belt 110, bending of the belt 110 at the cut in the belt 110 occurs primarily along plane B (e.g., out of the page and away from plane A) when the belt 110 is employed in the rotary electrical contact devices described herein (e.g., the rotary electrical contact devices 100, 400). As a result, the belt 110 can be made to have a greater bending stiffness along plane A as compared to plane B (e.g., by making the belt 110 to have a width w that is greater than its thickness t) while still providing sufficient flexibility to bending along plane B to allow the belt 110 to wrap around sheaves of a rotary electrical contact device.

By having an aspect ratio of greater than 1:1 (e.g., greater than or equal to 2:1, 5:1, or 10:1), the belt 110 can be made to have a smaller profile than a helical coil belt or other 1:1 aspect ratio belt while maintaining a same (or reduced) electrical resistance. Referring once again to FIG. 1, in an exemplary embodiment the belt 110 comprises an electrically conductive strip that has a width that is greater than its thickness (e.g., a width that is greater than or equal to twice the thickness, five times the thickness, or ten times the thickness). In exemplary embodiments, the belt 110 comprises a strip of copper, a strip of a copper alloy, or a plated metal strip (e.g., a strip of copper plated in gold). The device 100 can be smaller than a rotary electrical contact device that incorporates a belt having a 1:1 aspect ratio, since the sheaves 102-108 do not need to be spaced far enough apart to accommodate a thickness that is as great as the width of the belt 110.

Furthermore, unlike a helical coil, the belt 110 may be designed to be substantially inextensible, such that it can be placed under tension without substantial deformation of the belt 110. In the exemplary rotary electrical contact device 100, the belt 110 is placed under tension so as to maintain firm electrical contact between the belt 110 and the sheaves 102-108. The belt 110 can be placed under tension by appropriate selection of a size of the belt 110 and the sheaves 102-108 such that the sheaves 102-108 exert pressure on the belt 110 when the belt 110 is installed in the device 100. In other embodiments, the belt 110 can be placed under tension by applying a force to the planetary sheaves 106, 108 that causes the planetary sheaves 106, 108 to place the belt 110 under tension. Such a force can be applied to the planetary sheaves 106, 108 by way of the coupling mechanism 112. In further embodiments, one or more of the sheaves 102-108 may be adapted to exert outward expansion force that results in increased belt tension, by forcing the belt 110 to travel a longer round-trip path. In one such embodiment, a sheave may incorporate slits, cantilevered arms, torsional springs, or other embedded structures adapted to the generation of an outward expansion force, or other forces deemed desirable for belt tensioning. In further embodiments, the coupling mechanism 112 can comprise a joint that allows the axis of sheave 106, the axis of sheave 108, or both axes, to rotate about the main axis 114 of the device. A force to cause tension in the belt may be applied by pushing the sheaves 106 and/or 108 apart and toward the belt 110 (e.g., with a torsion spring or other tensioning device incorporated in the coupling mechanism 112). The planetary sheaves 106 and 108 would be pushed apart by the spring force in the azimuthal direction with respect to the main axis 114, so that they have a tendency to cause the belt 110 to be placed in tension.

Figure 2:
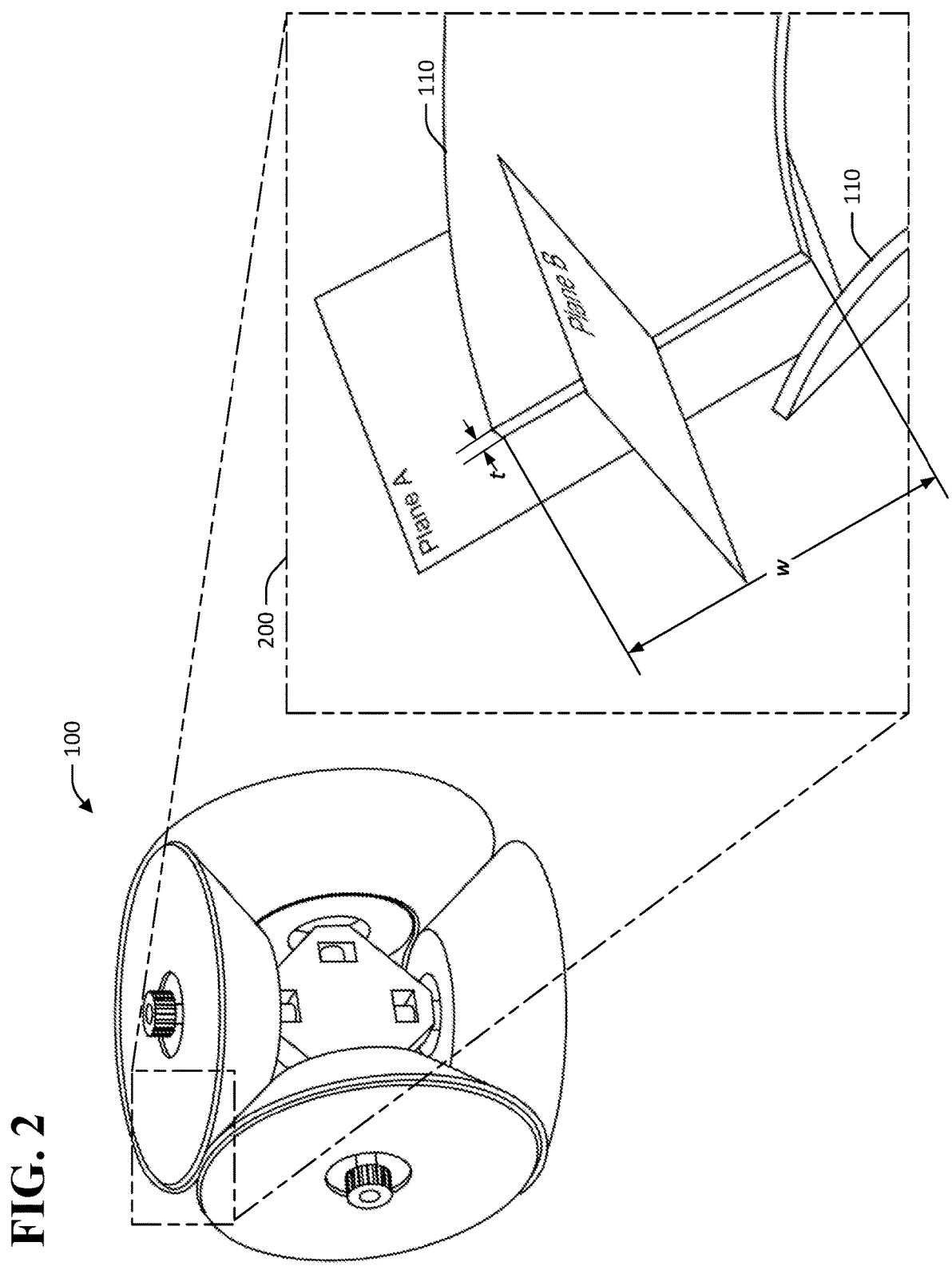
FIG. 2 is a diagram that illustrates bending of an exemplary conductive belt in a rotary electrical contact device.
Figure 3:
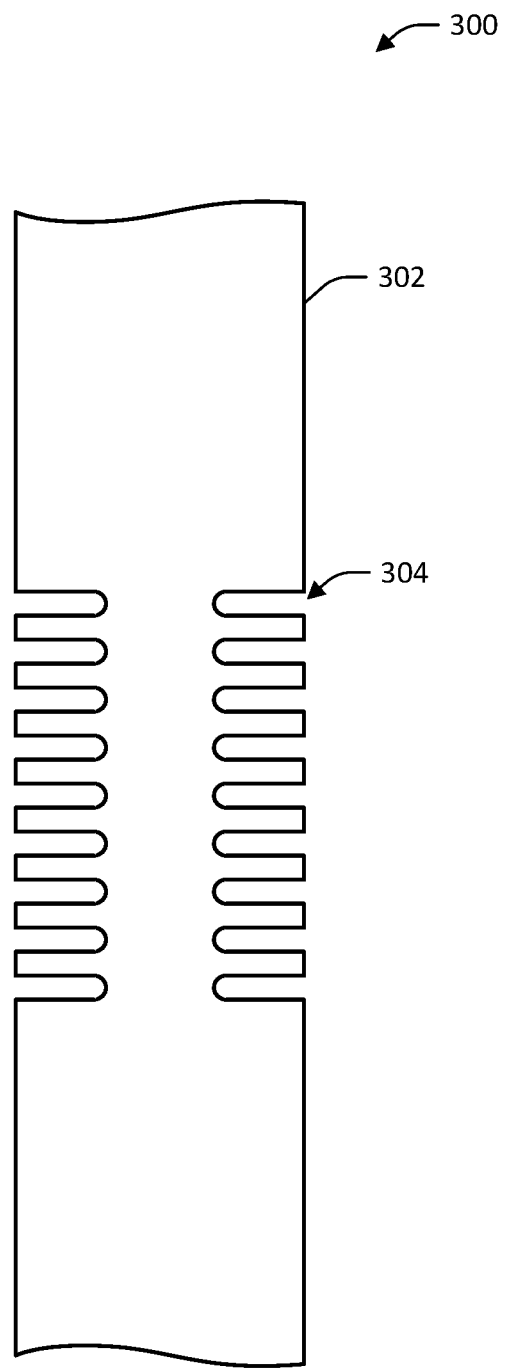
FIG. 3 is a cut view of an exemplary conductive belt having a flexure formed therein.

In other exemplary embodiments, the belt 110 can include a plurality of flexures that are configured to reduce bending stiffness of the belt 110 in the primary bending plane of the belt (e.g., plane B as shown in FIG. 2). By way of example, and referring now to FIG. 3, a section 300 of an exemplary belt 302 is shown, wherein the belt 300 has a plurality of flexures (e.g., flexure 304) formed therein. In exemplary embodiments, the flexures 304 comprise notches that extend from edges of the belt 302 into the width of the belt 302 and perpendicular to the length of the belt 302. The notches can be etched, machined, or otherwise formed in the belt 302. In other exemplary embodiments, the flexures 304 can comprise voids of various shapes formed in the belt 302.

Figure 4:
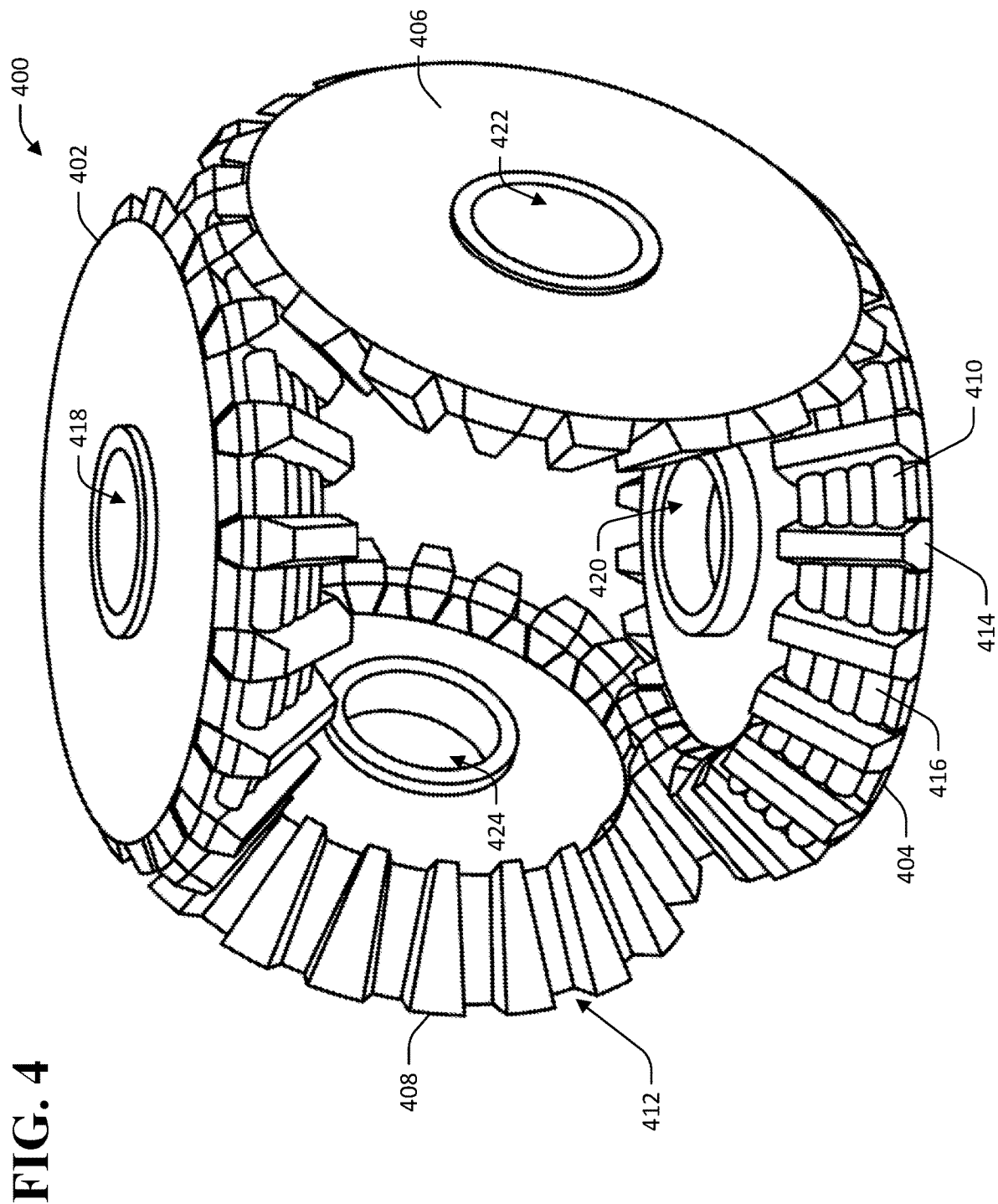
FIG. 4 depicts another exemplary rotary electrical contact device.

Referring now to FIG. 4, another exemplary rotary electrical contact device 400 is shown. The rotary electrical contact device 400 comprises a plurality of sheaves 402-408 and a belt 410 that has an aspect ratio greater than 1:1 (e.g., greater than or equal to 2:1, 5:1, or 10:1). The sheaves 402-408 include a first primary sheave 402, a second primary sheave 404, and two planetary sheaves 406, 408. The sheaves 402-408 and the belt 410 are arranged in similar fashion to the sheaves 102-108 and the belt 110 of the rotary electrical contact device 100 such that the belt 410 maintains electrical contact between the first primary sheave 402 and the second primary sheave 404 opposite the first sheave 402. As at least one of the first primary sheave 402 or the second primary sheave 404 rotates, the planetary sheaves 406, 408 revolve about the primary sheaves 402, 404 causing the belt 410 to make rolling contact around the perimeters of the first primary sheave 402 and the second primary sheave 404.

In the exemplary rotary electrical contact device 400, the sheaves 402-408 each comprise a plurality of grooves (referred to herein collectively by reference number 412) that are configured to mate with a plurality of cleats (referred to herein collectively by reference number 414), that are included on the belt 410. The belt 410 further includes a longitudinal conductive element 416 that runs a length of the belt 410. The cleats 414 and the grooves 412 are electrically conductive, such that mating of the cleats 414 of the belt 410 and the grooves 412 of the sheaves 402-408 makes electrical connections between the belt 410 and the sheaves 402-408. As the planetary sheaves 406, 408 revolve about the primary sheaves 402, 404, cleats 414 of the belt 410 are rolled into the grooves 412 of the sheaves 402-408, thereby making electrical contact between the first primary sheave 402 and the second primary sheave 404.

Inclusion of the cleats 414 and grooves 412 in the rotary electrical contact device enforces a no-slip condition between the belt 410 and the sheaves 402-408, thereby avoiding wear of the belt 410 associated with sliding contact between the belt 410 and the sheaves 402-408. The longitudinal conductive element 416 and the cleats 414 of the belt 410 can further be made of different materials or have different geometries in order to improve performance of the belt in various respects, as will be described in greater detail below. In some embodiments, cleat geometry is adapted to preventing mechanical contact between the longitudinal conductive element 416 and the sheaves 402-408, thereby allowing non-wear-resistant materials to be used in the construction of conductive element 416.

As noted above, the belt 410 includes a longitudinal conductive element 416 that runs a length of the belt 410. The cleats 414 are attached to the longitudinal conductive element 416 such that the cleats 414 are maintained in electrical contact with the longitudinal conductive element 416. The longitudinal conductive element 416 is configured to provide a low axial resistance (e.g., low electrical resistance along a length of the belt 410), a low bending stiffness in a primary bending direction of the belt 410, and a high longitudinal stiffness, such that the belt 410 does not substantially deform when placed under tension. As noted above, the cleats 414 can be configured to be both electrically conductive and resistant to wear during operation of the rotary electrical contact device 400.

Figure 5A:
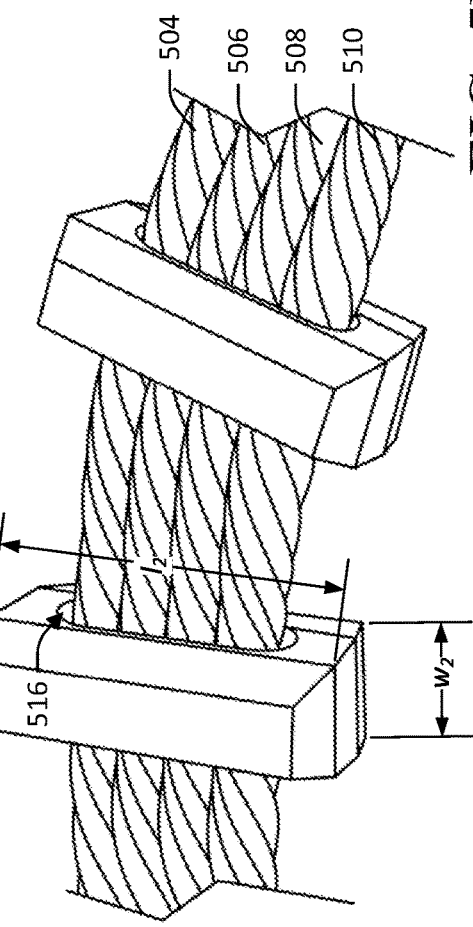
FIGS. 5A and 5B are cut views of exemplary conductive belts.
Figure 5B:
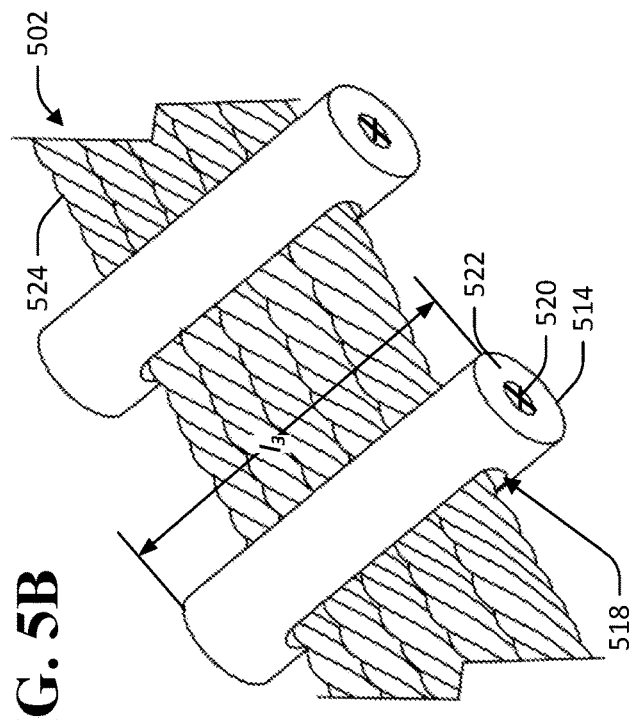

The longitudinal conductive element 416 shown in the rotary electrical contact device 400 depicted in FIG. 4 comprises a plurality of conductive cables to which the cleats 414 are attached. With more particularity, and referring now to FIGS. 5A and 5B, partial views of exemplary belts 500, 502 are shown, wherein the belts 500, 502 each comprise a respective plurality of conductive cables formed from braided conductive strands. With reference now solely to FIG. 5A, the belt 500 comprises a plurality of conductive cables 504-510. In the exemplary belt 500, the cables 504-510 are formed of respective pluralities of conductive wires braided together. The braided wires can be tinned with a conductive coating to provide resistance to fraying or oxidation of the wires while maintaining electrical conductivity of the cables 504-510. In other embodiments, each of the cables 504-510 can consist of a single conductive wire. In still other embodiments, each of the cables 504-510 comprises a plurality of bundled conductive wires.

Figure 6:
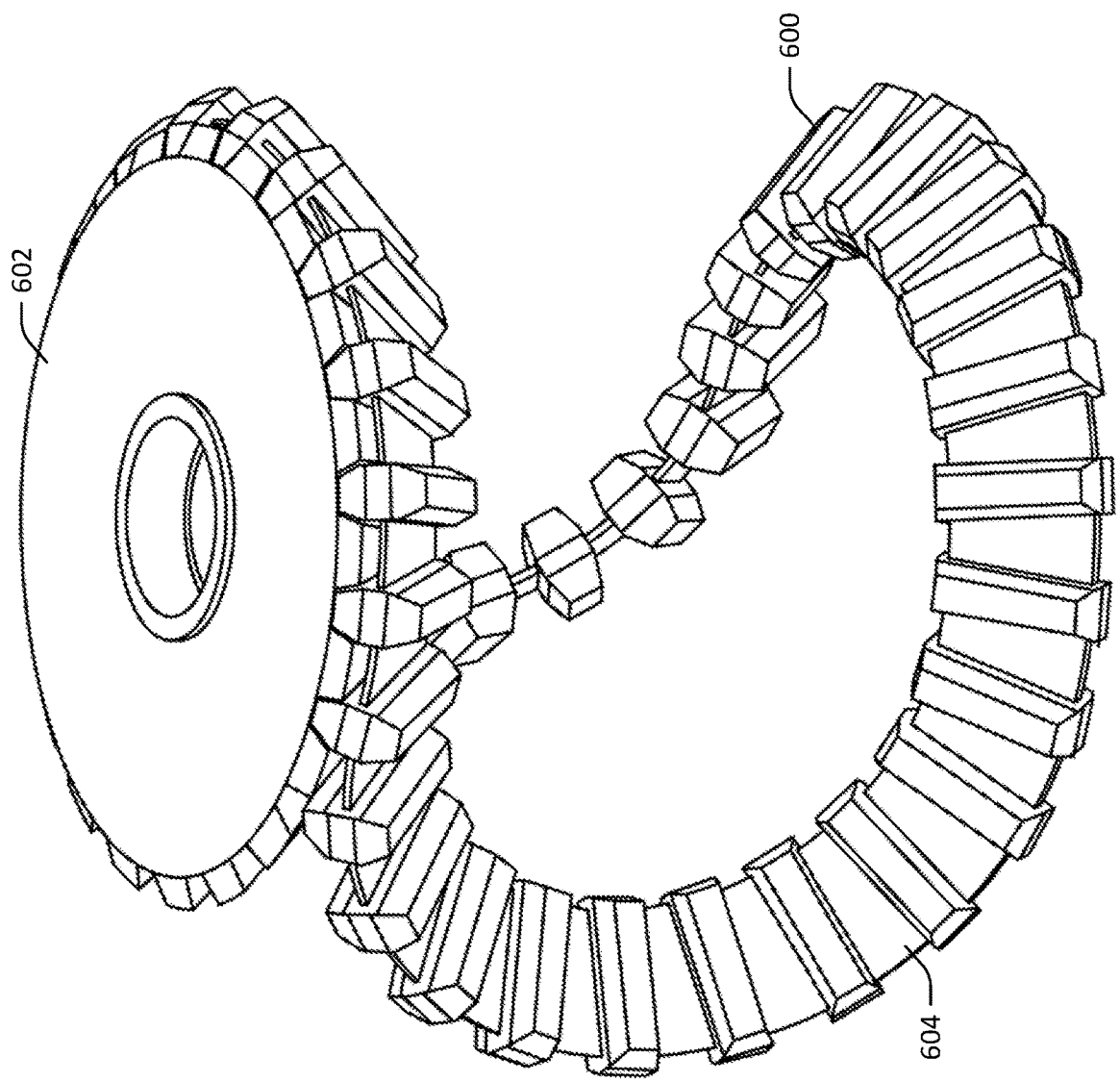
FIG. 6 depicts an exemplary conductive belt mated to a sheave.

In various other exemplary embodiments, the longitudinal conductive element 416 can be a conductive strip, a single conductive cable, or substantially any other conductive element that is capable of bending to maintain contact of the belt 410 with the sheaves 402-408. For example, and referring now to FIG. 6, an exemplary conductive belt 600 is shown mated to a sheave 602, wherein the belt 600 comprises a conductive strip 604 that serves as a longitudinal conductive element.

The cleats 414 of the belt 410 are attached to the longitudinal conductive element 416 such that the cleats 414 are in electrical contact with the longitudinal conductive element 416. The belt 410 can be constructed by extending the longitudinal conductive element 416 through the cleats 414 and attaching the cleats to the longitudinal conductive element 416. In an example, and referring again to FIGS. 5A and 5B, the belts 500, 502 respectively comprise cleats 512, 514. The cleats 512, 514 have respective cavities 516, 518 formed therein. The cavities 516, 518 extend through the cleats 512, 514. The cavities 516, 518 are configured to accommodate the longitudinal conductive elements of the belts 500, 502. For example, and referring now solely to FIG. 5A, the cavity 516 is configured to accommodate the cables 504-510 such that the cables 504-510 are aligned in a single row and extend through the cleat 512. The cavity 516 is formed in the interior of the cleat 512 and extends along a portion of the length $l_2$ of the cleat 512. The cavity 516 extends through the whole width $w_2$ of the cleat 512 to allow the cables 504-510 to extend through the cleat 512. Hence, in the belt 500, the cleat 512 surrounds a portion of the cables 504-510.

The cleats 414 of the belt 410 can be attached to the longitudinal conductive element 416 by way of any means suitable to maintain the cleats 414 and the longitudinal conductive element 416 in electrical contact with one another. In exemplary embodiments, the cleats 414 can be welded, brazed, or soldered to the longitudinal conductive element 416. In other embodiments, the cleats 414 can be crimped to the longitudinal conductive element 416. In still other exemplary embodiments, the cleats 414 can be attached to the longitudinal conductive element 416 by way of various fastening means. By way of an example, and referring now to FIG. 5B, the cleat 514 includes a set screw 520. The set screw 520 is set into a first face 522 of the cleat 514 such that the set screw 520 extends into the cavity 518 along a length $l_3$ of the cleat 514. The set screw 520 exerts a force against a longitudinal conductive element 524 of the belt 502 that causes the longitudinal conductive element 524 to be maintained in contact with the cleat 514, thereby ensuring that electrical contact between the longitudinal conductive element 524 and the cleat 514 is maintained.

In the exemplary rotary electrical contact device 400 depicted in FIG. 4, the cleats of the belt 410 and corresponding grooves of the sheaves 402-408 of the rotary electrical contact device 400 have trapezoidal profiles. In other exemplary embodiments, the cleats of the belt 410 and corresponding grooves of the sheaves 402-408 can have rectangular profiles, triangular profiles, circular profiles, elliptical profiles, involute profiles, etc. In some embodiments, the aforementioned profiles may be specifically adapted to minimize sliding contact wear during engagement and disengagement of the sheaves and grooves. In other embodiments, this engagement/disengagement interaction may be adapted to "contact wiping" wherein a prescribed degree of sliding contact is employed to facilitate removal of oxide and other contamination that might otherwise result in high contact resistance.

Figure 7C:
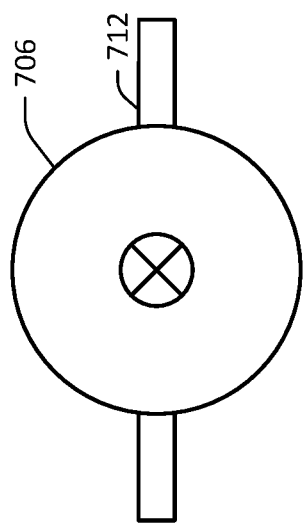
FIGS. 7A-7C depict exemplary cleat profiles.
Figure 7B:
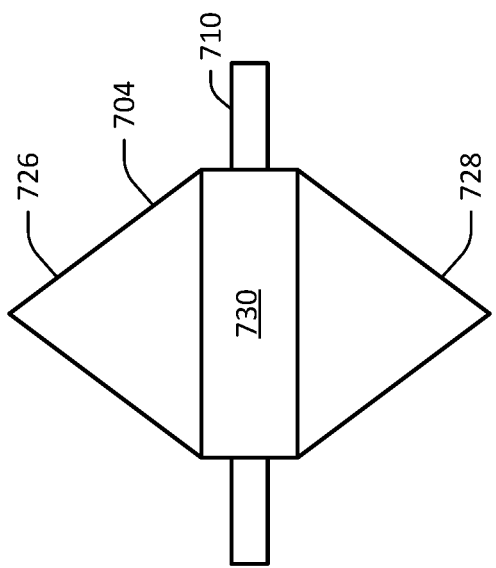
Figure 7A:
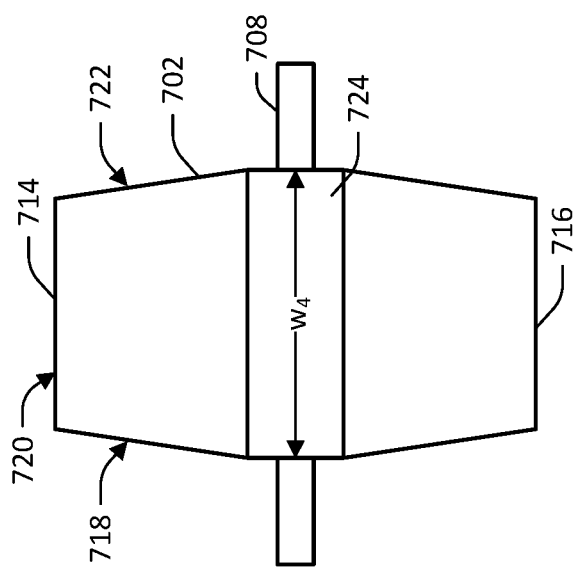

By way of various examples, and referring now to FIGS. 7A-7C, a plurality of exemplary cleats 702-706 are shown in profile view, wherein the cleats 702-706 are attached to respective longitudinal conductive elements 708-712. Referring now solely to FIG. 7A, the cleat 702 has a trapezoidal profile. The cleat 702 comprises an upper trapezoidal portion 714 and a lower trapezoidal portion 716 each having the shape of a trapezoidal prism (e.g., extending into the page). The trapezoidal portions 714, 716 of the cleat 702 are configured to mate with matching grooves in sheaves of a rotary electrical contact device (e.g., the rotary electrical contact device 400). For example, the upper trapezoidal portion 714 includes three faces 718-722 that make contact with matching surfaces of a trapezoidal groove (e.g., groove 412 in the sheave 408). The cleat 702 can further include a central portion 724 disposed between the upper trapezoidal portion 714 and the lower trapezoidal portion 716. The central portion 724 of the cleat 702 can include a cavity (not shown) that extends through a width $w_4$ of the cleat 702 to allow the longitudinal conductive element 708 to pass through the cleat 702. In other exemplary embodiments, the central portion 724 can be omitted from the cleat 702, and a cavity can be formed from the trapezoidal portions 714, 716 to accommodate the longitudinal conductive element 708.

Referring now solely to FIG. 7B, the cleat 704 has a triangular profile. The cleat 704 comprises an upper triangular portion 726 and a lower triangular portion 728 each having the shape of a triangular prism (e.g., extending into the page). The triangular portions 726, 728 can be configured to mate with matching triangular grooves in a sheave. In some embodiments, the cleat 704 can include a central portion 730 with a cavity formed therein that accommodates the longitudinal conductive element 710. In other embodiments, the central portion 730 can be omitted, and the cavity accommodating the longitudinal conductive element 710 can be formed in the triangular portions 726, 728.

Referring now solely to FIG. 7C, the cleat 706 has a circular profile such that the cleat 706 has a substantially cylindrical shape (e.g., extending into the page). In some embodiments, the cleat can be formed as a monolithic element. In other embodiments, the cleat can be formed from a first hemispherical element and a second hemispherical element that are joined together (e.g., joined along a diameter of the cleat 706). As noted above with respect to the cleats 702, 704, the cleat 706 can include a cavity formed therein that allows the longitudinal conductive element 712 to pass through the cleat 706.

Referring once again to FIG. 4, the cleats 414 and the longitudinal conductive element 416 of the belt 410 can be made of different materials in order to enhance different properties. For instance, the cleats 414 can be constructed so as to have high electrical conductivity and high resistance to physical wear during operation of the device 400. By way of example, and not limitation, the cleats 414 can be substantially solid, excepting a cavity formed therein to accommodate the longitudinal conductive element 416. In further examples, the cleats 414 can be formed of copper, a metal matrix composite of copper and tungsten, aluminum, etc. The cleats 414 can further be coated with various materials to prevent wear of the cleats 414 or confer other desirable properties. In an example, the cleats 414 can be coated with titanium nitride to prevent wear of the cleats 414.

In further examples, the longitudinal conductive element 416 can be constructed to have a high electrical conductivity and to be highly flexible along a primary bending axis of the belt 410. In an embodiment, the longitudinal conductive element 416 can comprise braided strands of copper. In further embodiments, the braided strands of copper can be plated with silver, gold, tin, etc., in order to inhibit galling or fretting of the braided strands.

The sheaves 402-408 can further be made wholly or partially of a conductive material. By way of example, and not limitation, the sheaves 402-408 can each be made entirely of a conductive metal. For instance, the sheaves 402-408 can be made of copper or a copper alloy, silver or a silver alloy, aluminum, etc. In other examples, the sheaves 402-408 can be composed of oxygen-free high conductivity copper (e.g., having an oxygen content of 0.001% or less). In still other exemplary embodiments, an outer portion of the sheaves 402-408 (e.g., that includes the grooves 412) can be made of a conductive material, while an inner portion of the sheaves 402-408 (e.g., near openings 418-424) can be made of a material that is less conductive (e.g., a ceramic or steel).

The rotary electrical contact device 400 is depicted in FIG. 4 without a coupling mechanism independent from the belt 410 that couples the primary sheaves 402, 404 and the planetary sheaves 406, 408. In embodiments, the electrical contact device 400 can be operated without a coupling mechanism between the sheaves 402-408 other than the belt 410. In other embodiments, the rotary electrical contact device 400 can include a coupling mechanism that is disposed between the sheaves 402, 404 and the planetary sheaves 406, 408 similar to the coupling mechanism 112 shown in the rotary electrical contact device 100 depicted in FIG. 1. By way of example, each of the sheaves 402-408 can include respective openings 418-424 that extend through the sheaves and accommodate rotatable coupling among the sheaves 402-408 (e.g., by way of axles, bearings, etc.). In embodiments wherein the electrical contact device 400 includes a coupling mechanism that couples the sheaves 402-408, the coupling mechanism can be configured to apply pressure to the planetary sheaves 406, 408 in order to place the belt 410 under tension.

Figure 8:
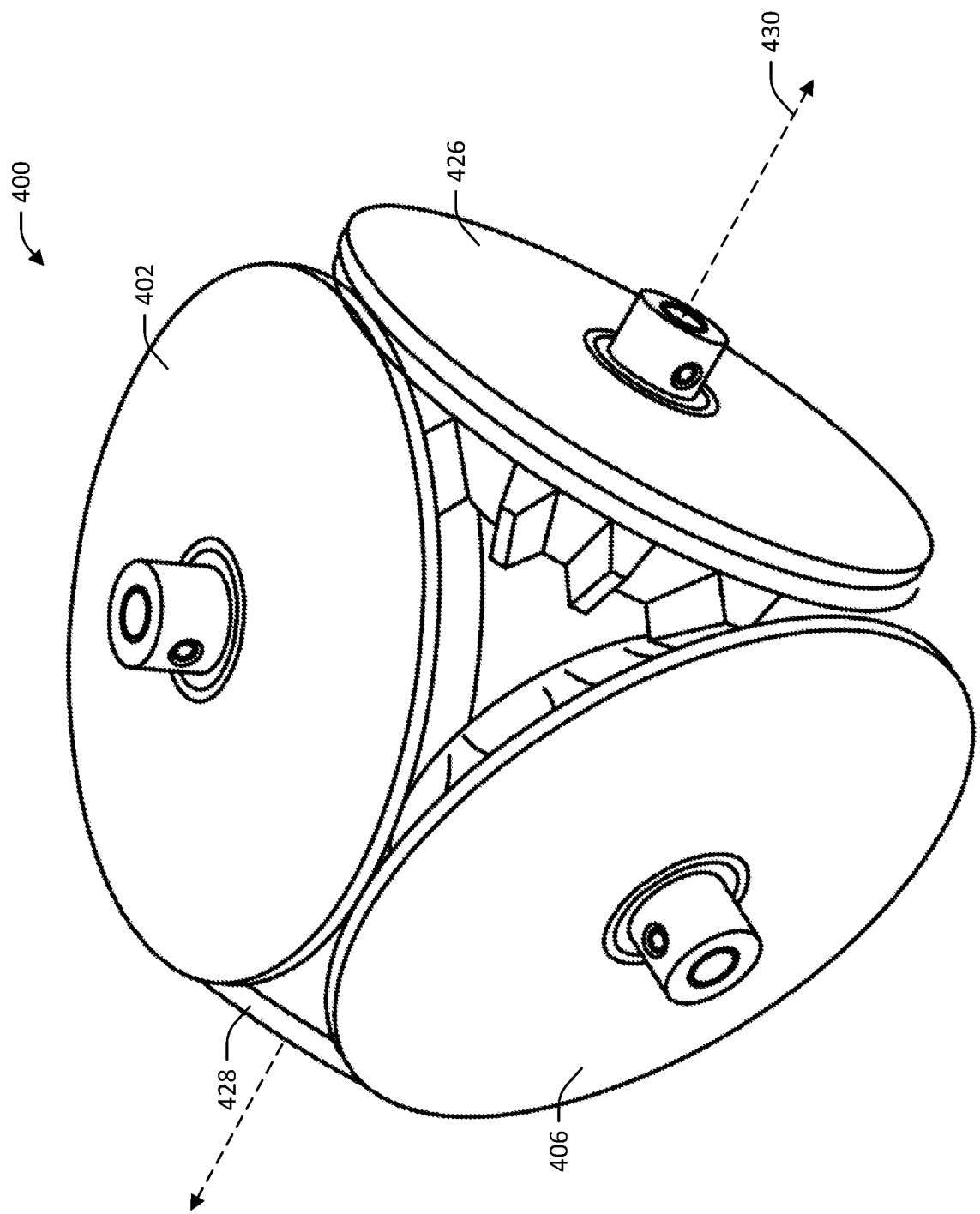
FIG. 8 depicts an exemplary rotary electrical contact device that includes idler sheaves.

Referring now to FIG. 8, another perspective view of the exemplary rotary electrical contact device 400 is shown wherein the device 400 further comprises a first idler sheave 426 and a second idler sheave 428. The first idler sheave 426 is disposed about an axis 430 between the first primary sheave 402 and the second primary sheave 404 (not visible) and between the first planetary sheave 406 and the second planetary sheave 408 (not visible). The second idler sheave 428 is positioned along the third axis 430 opposite the first idler sheave 426 and is similarly positioned between 430 between the first primary sheave 402 and the second primary sheave 404 and between the first planetary sheave 406 and the second planetary sheave 408. During operation, the idler sheaves 426, 428 revolve about the primary sheaves 402, 404. The idler sheaves 426, 428 apply pressure to the belt 410 (not shown) and the sheaves 402-408 so as to maintain firm contact between the belt 410 and the sheaves 402-408.

It will be understood that the preceding discussion principally describes applications of a rotary electrical contact device that are directed towards uninterrupted galvanic contact between a stationary electrically conductive structure and a rotating electrically conductive structure. As used herein, the term "galvanic", is meant to denote direct physical contact between electrically conductive structures that allows passage of electrical current by simple conduction. Inductive coupling is a common example of non-galvanic contact, wherein an ac signal may be electromagnetically transmitted across a non-conducting gap. A galvanic contact on the other hand is capable of transmitting both ac and dc current and has substantially zero dependence on inductive (or capacitive) coupling.

In some devices that incorporate the rotary electrical contact devices described above (e.g., the rotary electrical contact devices 100, 400), a complete galvanic electrical circuit between a stationary frame of reference and a rotating frame requires two independent electrically isolated rotary contacts, however. For example, in various configurations of a synchronous generator, electrical current delivered to an electromagnet comprising a wire wound rotor may be delivered from the stationary frame to the rotating frame through a first rotary electrical contact, wherein a second rotary electrical contact provides a current return path from the rotating frame to the stationary frame. This objective may be accomplished by suitable arrangement of two separate rotary electrical contacts configured according to embodiments described herein, such as the rotary electrical contact device 400 of FIG. 4.

In some applications, the use of two separate rotary electrical contacts as described above may be deemed cumbersome or inconvenient. In other applications, such an arrangement may be prohibitive from the standpoint of added parasitic inductance. Various structures are now described that are adapted to providing two independent galvanic contact current paths that are electrically isolated from each other and integrated into a single device. In many such embodiments, low series inductance is readily achieved.

Referring now to FIGS. 9A and 9B, another exemplary rotary electrical contact device 900 is shown, wherein the rotary electrical contact device 900 incorporates two electrically isolated current paths from a first sheave to a second sheave. FIG. 9A depicts a perspective cut view of the rotary electrical contact device 900. FIG. 9B depicts a partial cross-sectional view of a portion of the rotary electrical contact device 900 to illustrate various features of a belt and sheaves of the rotary electrical contact device 900.

Referring now jointly to FIGS. 9A and 9B, the rotary electrical contact device 900 comprises a first sheave 902, a second sheave 904, and two planetary sheaves 906, 908. The rotary electrical contact device 900 further includes a belt 910 that facilitates electrical contact between the first sheave 902 and the second sheave 904.

The sheaves 902-908 and the belt 910 are configured such that two distinct, electrically isolated current paths are formed between the first sheave 902 and the second sheave 904 by way of the belt 910 during operation of the rotary electrical contact device 900. The first sheave 902 comprises a first conductive element 912 and a second conductive element 914. The first sheave 902 further comprises a layer of electrically insulating material 916. The insulating layer 916 is disposed between the first conductive element 912 and the second conductive element 914 such that the first conductive element 912 and the second conductive element 914 are electrically isolated from one other. Stated differently, the insulating layer 916 is positioned such that the first conductive element 912 and the second conductive element 914 do not make galvanic electrical contact with one another. As described in greater detail below, the first conductive element 912 forms part of a first current path through the rotary electrical contact device 900 whereas the second conductive element 914 forms part of a separate second current path through the rotary electrical contact device 900.

It is to be understood that while such details are not depicted for the second sheave 904 in FIG. 9A, the second sheave 904 can be configured substantially similarly to the first sheave 902. With more specificity, the second sheave 904 can be configured such that the second sheave 904 includes first and second conductive elements and an insulating layer disposed between the first and second conductive elements as described above with respect to the first sheave 902. The second sheave 904 can further include coaxial connectors, as described in greater detail below with respect to the first sheave 902.

The belt 910 is configured to make electrical contact with each of the first conductive element 912 and the second conductive element 914 separately. The belt 910 comprises a first sidewall 918, a second sidewall 920, and an electrically insulating core 922 that is positioned between the first sidewall 918 and the second sidewall 920. The sidewalls 918, 920 are composed of an electrically conductive material. In various non-limiting examples, the sidewalls 918, 920 can be composed of copper, a metal matrix composite of copper and tungsten, or aluminum. The core 922 of the belt can be composed of a flexible material such as an electrically insulating polymer. By way of example, and not limitation, the electrically insulating core 922 can be composed of an elastomer such as silicone.

The belt 910 mates to a groove 924 in the sheave 902 such that the first sidewall 918 makes electrical contact with the first conductive element 912 of the sheave 902 and the second sidewall 920 makes electrical contact with the second conductive element 914 of the sheave 902. The belt 910 depicted in FIGS. 9A and 9B has a trapezoidal profile wherein the sidewalls 918, 920 form legs of a trapezoid. It is to be understood, however, that the belt 910 can have any of various other profiles (e.g., triangular, rectangular, oval, etc.), and a shape of the groove 924 can be configured to accommodate substantially any desired shape of the belt 910.

The belt 910 is configured to make electrical contact between first conductive elements of the first sheave 902 and second sheave 904 and also between second conductive elements of the sheaves 902, 904. Thus, during operation of the rotary electrical contact device 900, the belt 910 facilitates electrical contact between the first conductive element 912 of the first sheave 902 and a first conductive element of the second sheave 904, and further between the second conductive element 914 of the first sheave 902 and a second conductive element of the second sheave 904 by way of distinct current paths. By way of example, a first electrical current can flow along a first path from the first conductive element 912 into the first sidewall 918 (e.g., at one or more points of contact between the first sidewall 918 and the first conductive element 912) through the first sidewall 918 along the length of the belt 910, and then into a first conductive element of the second sheave 904. Further, a second electrical current can flow along a second path from a second conductive element of the second sheave 904 into the second sidewall 920 of the belt 910 (e.g., at a point of contact between the second sidewall 920 and the second conductive element of the second sheave 904), through the second sidewall 920 along the length of the belt 910, and then into the second conductive element 914 of the first sheave 902.

From the foregoing, it is to be understood that the rotary electrical contact device 900 is well-suited to applications where a current is to be delivered from one device in a stationary frame of reference to another device in a rotating frame, and the current then returned from the rotating frame to the stationary frame. For instance, the rotary electrical contact device 900 is well-suited to providing a delivery current path and a return current path to an electromagnet in a synchronous generator.

In various contemplated embodiments of a rotary electrical contact device, belt design is directed towards providing low series resistance, high mechanical flexibility, and low series inductance. Embodiments adapted to high current pulse applications may be further directed to cancellation of repulsive Lorentz force between anti-parallel current carrying conductors, and minimization of the skin and proximity effects that could otherwise result in high resistive losses.

The above objectives may be realized through the use of interdigitated laminar conductors separated by electrically insulating layers. In an exemplary embodiment, the belt 910 comprises a first plurality of conductive ribbons, referred to herein collectively as ribbons 926, and a second plurality of conductive ribbons, referred to herein collectively as ribbons 928. The conductive ribbons 926 extend inward from the first sidewall 918 of the belt 910 along the width of the belt 910. Similarly, the conductive ribbons 928 extend inward from the second sidewall 920 of the belt 910 along the width of the belt 910. The conductive ribbons 926, 928 each further extend along at least a portion of the length of the belt 910. For example, the conductive ribbons 926, 928 can extend along an entirety of the length of the belt 910. In other embodiments, the conductive ribbons 926, 928 can extend along only a portion of the length of the belt. In such embodiments, the belt 910 can include other similarly configured conductive ribbons that extend along additional portions of the length of the belt 910.

Each of the ribbons 926, 928 is separated from each of the other ribbons in the pluralities of ribbons 926, 928 by electrically insulating layers of the core 922 of the belt 910. Thus, the core 922 maintains electrical isolation between the first plurality of ribbons 926, which are connected to one another by way of the first conductive sidewall 918, and the second plurality of ribbons 928, which are connected to one another by way of the second conductive sidewall 920. As noted above, the first sidewall 918 and the second sidewall 920 provide separate current paths along the belt 910 and are part of alternate current paths from the first sheave 902 to the second sheave 904 of the rotary electrical contact device 900. As current flows through the first sidewall 918 along the length of the belt 910, the current also flows through the ribbons 926. Likewise, as current flows through the second sidewall 920 along the length of the belt 910, the current also flows through the ribbons 928.

The pluralities of ribbons 926, 928 can include substantially any number of conductive ribbons. By way of example, the exemplary belt 910 is depicted in FIG. 9B as including four ribbons in the first plurality of ribbons 926 and four ribbons in the second plurality of ribbons 928. In another example, the belt 910 can include ten or more ribbons in the first plurality of ribbons 926 and ten or more ribbons in the second plurality of ribbons 928.

In connection with providing a delivery path for a current and a return path for the current through the rotary electrical contact device 900, the ribbons 926, 928 of the belt 910 can be positioned in an alternating fashion such that ribbons in the first plurality of ribbons 926 are adjacent to ribbons in the second plurality of ribbons 928 and vice versa. Stated differently, moving downward through the thickness of the belt 910 the ribbons 926, 928 are positioned such that the first ribbon encountered is a ribbon of the first plurality of ribbons, a second ribbon encountered is a ribbon of the second plurality of ribbons 928, a third ribbon encountered is a ribbon of the first plurality of ribbons 926, a fourth ribbon encountered is a ribbon of the second plurality of ribbons 928, and so on. The arrangement of the ribbons 926, 928 in an alternating fashion as described above facilitates reducing Lorentz force effects via cancellation of overlapping opposing magnetic fields when currents of the same magnitude and opposite direction flow through the ribbons 926 and the ribbons 928 (e.g., in an application wherein the rotary electrical contact device 900 provides a delivery current path and a return current path for an electric machine connected to the rotary electrical contact device 900).

The rotary electrical contact device 900 further comprises a plurality of coaxial connectors, referred to herein collectively as coaxial connectors 930. The coaxial connectors 930 are positioned on an outward-facing surface 932 of the sheave 902. The coaxial connectors 930 are configured to enable separate addressing of the two separate conductive paths of the rotary electrical contact device 900. In an exemplary embodiment, and as shown in FIG. 9B, a coaxial connector 930 can include a central conductor 934, an inner insulating layer 936 that surrounds the central conductor 934, an outer conductor 938 that is positioned around the inner insulating layer 936, and an outer insulating layer 940 that surrounds the outer conductor 938.

The central conductor 934 extends through the top surface 932 and through the second conductive element 914 of the sheave 902 such that an end 942 of the central conductor 934 is embedded in the first conductive element 912. The inner insulating layer 936 extends along the central conductor 934 far enough to electrically isolate the central conductor 934 from the second conductive element 914 while allowing the central conductor 934 to make galvanic contact with the first conductive element 912. The inner conductor 938 extends at least to the outward-facing surface 932 of the sheave 902 such that the inner conductor 938 makes galvanic contact with the second conductive element 914. In various embodiments, the inner conductor 938 extends at least partway into the second conductive element 914 to provide improved electrical contact between the inner conductor 938 and the second conductive element 914. The outer insulating layer 940 protects the other elements 934-938 of the connector 930 from damage and undesired electrical connections. The coaxial connectors 930 provide a means by which a device can be readily connected to each of two current paths through the rotary electrical contact device 900 (e.g., a first current path that includes the first conductive element 912 and a second current path that includes the second conductive element 914).

In exemplary embodiments, the use of thin ribbon-like conductors in a belt of a rotary electrical contact device is directed towards increasing belt flexibility in the principal bending plane and reducing series inductance and Lorentz force effects via cancellation of overlapping opposing magnetic fields. FIG. 9B further illustrates an embodiment by which electrical isolation between the two conductive elements of such a split sheave may be maintained, and a means by which a plurality of coaxial conductors may be interfaced to the split sheave to provide a low-inductance electrical connection. The repulsive Lorentz force acting between the conductive elements of each split sheave (e.g., conductive elements 914, 916 of sheave 902) may be counteracted through the use of mechanical fasteners and insulating bushings. Alternatively, interlocking features such as dovetail joints equipped with suitable electrically insulating spacers may be used.

The conductive ribbons 926, 928 of the belt 910 can comprise a plurality of fine-gauge wires that are woven, braided, or otherwise arranged to provide the desired combination of high longitudinal conductivity and mechanical flexibility. For example, tubular braided sleeves fabricated from high-electrical-conductivity material such as copper can be used to form the conductive ribbons 926, 928. An uninterrupted path for current flow can be provided by way of the ribbons 926, 928 along the longitudinal axis of the belt 910 with the use of techniques such as welding, brazing, soldering, mechanical fastening, layup techniques such as those used for manufacturing steel belted tires, and the like. In other embodiments, the ribbons 926, 928 can be formed of sections of braided wire mesh sleeve, wherein the circumference of the braided wire mesh sleeve is nominally equivalent to the circumference of the belt being manufactured. Such sections of tubular braid may be layered one on top of another, or a single long section of tubular braid may be folded upon itself in a manner analogous to rolling up a shirt sleeve. In these structures, the longitudinal axis of the belt runs along the circular circumference of the braided wire mesh tube (i.e., a circular cross section of the tube) so that the individual wires in the belt are continuous and unbroken in the longitudinal belt direction (e.g., along a length of the belt 910).

Reinforcing strands such as glass, nylon, an aramid fiber, or carbon fiber may be co-braided or otherwise embedded in such a weave, braid, etc., to impart high tensile strength and stiffness. Electrically insulating high-tensile strength fibers may be further woven into the belt 910 in a transverse direction (e.g., along the thickness of the belt 910) to prevent inter-layer delamination by Lorentz-force repulsion in pulsed high-current applications.

Thermal management may be provided to the belt 910 to address joule heating by providing a flow of gas through the woven wire sections of the belt 910. Such a gas flow may be introduced in any of a stationary, rotating, or planetary sheave (e.g., any of the sheaves 902-908). The sheaves 902-908 may also be cooled by a liquid cooling system, which provides cooling to the belt 910 via conduction.

The planetary sheaves 906, 908 may be constructed of any material that meets the mechanical requirements for a particular application, in applications in which there is no requirement for current flow to through them. In such embodiments, the current flow between the non-planetary sheaves 902, 904 is contained within the belt. As shown in FIG. 9B, a back side 944 of the belt 910 comprises an electrically insulating (e.g., elastomer) material. The insulating back side 944 of the belt 910 provides a non-conductive barrier between the electrically conducting members of the belt (e.g., the sidewalls 918, 920 and the ribbons 926, 928) and the sheaves 902, 904 at the back side 944 of the belt 910, thereby preventing shorting of the conductive elements 912, 914 of the sheave 902 by the belt 910. The curvature of the belt 910 is such that one side of the belt 910 (e.g., the shortest side of the trapezoidal cross section shown in FIG. 9B) always contacts the first and second sheaves 902, 904 along at least a portion of the length of the belt 910, but never contacts the planetary sheaves 906, 908. The opposite side of the belt (e.g., the longest side of the trapezoidal cross section shown in FIG. 9B) always contacts the planetary sheaves 906, 908 along at least a portion of the length of the belt 910 (but never the stationary or rotating sheaves). In additional embodiments, the electrical contact region at which the belt 910 mates to the sheave side walls may incorporate a wear resistant electrically conductive coating. This wear surface may incorporate slits, relief cuts, or other structures adapted to preserve the mechanical flexibility of the belt.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A rotary electrical contact device, comprising:
    a first sheave disposed about a first axis;
    a second sheave;
    a third sheave;
    a fourth sheave, wherein the third sheave and the fourth sheave revolve around the first axis during operation of the device; and
    a belt that extends around at least a portion of each of the first, second, third, and fourth sheaves such that the belt makes electrical contact with each of the four sheaves, the belt having an aspect ratio greater than 1:1.

2. The rotary electrical contact device of claim 1, wherein the second sheave is disposed about the first axis, and wherein the first sheave and the second sheave lie in substantially parallel planes.

3. The rotary electrical contact device of claim 2, wherein the third sheave is disposed about a second axis and the fourth sheave is disposed about a third axis, the second axis and the third axis being orthogonal to the first axis.

4. The rotary electrical contact device of claim 1, wherein the belt comprises a strip of conductive material, the strip having a width and a thickness, the width greater than the thickness.

5. The rotary electrical contact device of claim 1, the belt comprising a plurality of conductive cables.

6. The rotary electrical contact device of claim 5, wherein each of the cables comprises a plurality of strands of conductive material, the strands being braided together.

7. The rotary electrical contact device of claim 6, wherein each of the cables is tinned with a conductive coating.

8. The rotary electrical contact device of claim 1, the belt comprising a longitudinal conductive element that extends a length of the belt.

9. The rotary electrical contact device of claim 8, the belt further comprising a plurality of cleats, the cleats attached to the longitudinal conductive element, wherein further each of the sheaves includes a plurality of grooves, wherein the cleats are configured to mate with the grooves.

10. The rotary electrical contact device of claim 9, wherein the cleats and the grooves have trapezoidal profiles.

11. The rotary electrical contact device of claim 9, wherein the cleats and the grooves have involute profiles.

12. The rotary electrical contact device of claim 9, wherein the cleats are welded to the longitudinal conductive element.

13. The rotary electrical contact device of claim 1, wherein the first sheave comprises:
    a first conductive element;
    a second conductive element; and
    an insulating layer disposed between the first conductive element and the second conductive element such that the first conductive element and the second conductive element are electrically isolated from one another.

14. The rotary electrical contact device of claim 13, wherein the belt comprises:
    a first sidewall in contact with the first conductive element;
    a second sidewall in contact with the second conductive element;
    a first plurality of conductive ribbons connected to the first sidewall;
    a second plurality of conductive ribbons connected to the second sidewall; and
    a core element that electrically insulates the first plurality of conductive ribbons from the second plurality of conductive ribbons.

15. The rotary electrical contact device of claim 1, wherein the belt has a flexure formed therein.

16. The rotary electrical contact device of claim 1, further comprising:
    a first idler sheave; and
    a second idler sheave, wherein the idler sheaves revolve about the first sheave during operation of the rotary electrical contact device, the idler sheaves configured to make contact with the belt and increase a contact force of the belt with the first, second, third, and fourth sheaves.

17. An electrical contact device comprising:
- a first primary sheave disposed about a first axis;
- a second primary sheave;
- a first planetary sheave;
- a second planetary sheave, wherein the planetary sheaves revolve about the primary sheaves during operation of the device; and
- a belt that extends around at least a portion of each of the primary sheaves and the planetary sheaves such that the belt makes electrical contact with each of the four sheaves, the belt having a width and a thickness, the width of the belt being greater than the thickness of the belt.

18. The electrical contact device of claim 17, the belt comprising:
- a longitudinal conductive element that extends along a length of the belt; and
- a plurality of cleats, the cleats being attached to the longitudinal conductive element such that the cleats are in electrical contact with the longitudinal conductive element, the cleats being configured to mate with grooves formed in the primary sheaves and the planetary sheaves.

19. An electric machine, comprising:
- a rotor;
- a stator;
- a first sheave coupled to the rotor;
- a second sheave coupled to the stator;
- a third sheave;
- a fourth sheave, wherein the third sheave and the fourth sheave revolve around the first sheave and the second sheave during operation of the device; and
- a belt that extends around at least a portion of each of the first, second, third, and fourth sheaves such that the belt makes electrical contact with each of the four sheaves thereby forming a conductive path between the rotor and the stator, the belt having an aspect ratio greater than 1:1.

20. The electric machine of claim 19, wherein the electric machine is a motor.

* * * * *